United States Patent
Koga et al.

(10) Patent No.: US 11,092,976 B2
(45) Date of Patent: Aug. 17, 2021

(54) CONSTRUCTION MACHINE WORK MANAGEMENT SYSTEM AND CONSTRUCTION MACHINE

(71) Applicant: SUMITOMO HEAVY INDUSTRIES, LTD., Tokyo (JP)

(72) Inventors: Masato Koga, Kanagawa (JP); Masahito Indoh, Kanagawa (JP); Masaki Ogawa, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/144,021

(22) Filed: Sep. 27, 2018

(65) Prior Publication Data

US 2019/0028676 A1 Jan. 24, 2019

Related U.S. Application Data

(63) Continuation of application No. PCT/JP2017/012829, filed on Mar. 29, 2017.

(30) Foreign Application Priority Data

Mar. 31, 2016 (JP) .............. JP2016-073111
Jan. 18, 2017 (JP) .............. JP2017-006611

(51) Int. Cl.
*B64C 39/02* (2006.01)
*G05D 1/10* (2006.01)
(Continued)

(52) U.S. Cl.
CPC ............. *G05D 1/101* (2013.01); *B64C 13/20* (2013.01); *B64C 39/02* (2013.01); *B64C 39/024* (2013.01);
(Continued)

(58) Field of Classification Search
CPC ........ H04N 7/185; B64C 39/02; B64C 39/024
See application file for complete search history.

(56) References Cited

U.S. PATENT DOCUMENTS 7,513,070 B2  4/2009 Ogura et al.
9,616,748 B2  4/2017 Tsubone et al.
(Continued)

FOREIGN PATENT DOCUMENTS

DE   102014218749   3/2016
FR        3004801   10/2014
(Continued)

OTHER PUBLICATIONS

International Search Report for PCT/JP2017/012829 dated Jun. 6, 2017.
(Continued)

*Primary Examiner* — Jeremiah C Hallenbeck-Huber
(74) *Attorney, Agent, or Firm* — IPUSA, PLLC

(57) ABSTRACT

A construction machine work management system including a construction machine, an aircraft equipped with a camera, and a management device is provided. The construction machine work management system includes a processor configured to execute a program stored in a memory to implement processes of specifying a progress region within a work site on which work progress has been made by the construction machine, and setting up a flight path of the aircraft so that the camera of the aircraft can capture an image of the progress region.

18 Claims, 10 Drawing Sheets

(51) Int. Cl.
*G05D 1/00* (2006.01)
*B64C 13/20* (2006.01)
*G06Q 50/08* (2012.01)
*G06Q 10/06* (2012.01)
*E02F 9/26* (2006.01)
*B64D 47/08* (2006.01)
*G08B 25/10* (2006.01)
*E02F 9/20* (2006.01)
*G08B 13/196* (2006.01)
*G01C 21/00* (2006.01)
*H04N 7/18* (2006.01)

(52) U.S. Cl.
CPC ............... *B64D 47/08* (2013.01); *E02F 9/20* (2013.01); *E02F 9/26* (2013.01); *E02F 9/261* (2013.01); *G01C 21/00* (2013.01); *G05D 1/0094* (2013.01); *G06Q 10/06* (2013.01); *G06Q 50/08* (2013.01); *G08B 13/19608* (2013.01); *G08B 25/10* (2013.01); *H04N 7/185* (2013.01); *B64C 2201/123* (2013.01); *B64C 2201/14* (2013.01)

(56) References Cited

U.S. PATENT DOCUMENTS

| | | | |
|---|---|---|---|
| 2012/0143482 A1* | 6/2012 | Goossen | G08G 5/0034 701/120 |
| 2014/0012404 A1 | 1/2014 | Taylor et al. | |
| 2014/0163885 A1* | 6/2014 | Clar | G01C 15/00 702/5 |
| 2014/0316614 A1* | 10/2014 | Newman | G06Q 30/0611 701/3 |
| 2014/0316616 A1* | 10/2014 | Kugelmass | G06T 11/206 701/8 |
| 2016/0266577 A1* | 9/2016 | Kerzner | G05D 1/0022 |
| 2016/0292933 A1* | 10/2016 | Sprock | G07C 5/008 |
| 2016/0321763 A1* | 11/2016 | Shike | G06Q 10/06313 |
| 2017/0083979 A1* | 3/2017 | Winn | H04L 67/32 |
| 2017/0109577 A1* | 4/2017 | Wang | G06F 16/29 |
| 2017/0161972 A1* | 6/2017 | Moloney | G07C 5/0841 |
| 2017/0193646 A1* | 7/2017 | Wang | B64C 39/024 |
| 2018/0040209 A1 | 2/2018 | Lim | |

FOREIGN PATENT DOCUMENTS

| | | |
|---|---|---|
| JP | H03-063310 | 3/1991 |
| JP | 2006-284393 | 10/2006 |
| JP | 2008-186145 | 8/2008 |
| JP | 4233932 | 3/2009 |
| JP | 2010-203207 | 9/2010 |
| JP | 5234546 | 7/2013 |
| JP | 2014-129676 | 7/2014 |
| JP | 2014-149620 | 8/2014 |
| JP | 2015-113100 | 6/2015 |
| JP | 5775632 | 9/2015 |
| KR | 101550036 | 9/2015 |

OTHER PUBLICATIONS

Komatsu Report 2015, [online], Komatsu Ltd., Jul. 26, 2015 (Jul. 26, 2015), pp. 8 to 16, [retrieval date May 25, 2017 (May 25, 2017)], Internet: <URL:https://web.archive.org/web/20150726080612/http://www.komatsu.co.jp:80/CompanyInfo/ir/annual/html/2015/pdfs/komatsu-reports2015-ja.pdf>.

Part 3:Keibi-hen Saishin Gijutsu de Shikaku o Kesu, Keibiin mo Denshi Sobi de Kyoka, Nikkei Electronics December Issue, Nov. 20, 2015 (Nov. 20, 2015), No. 1162, pp. 36 to 41, ISSN 0385-1680.

Teizer Jochen Ed—Trappey Amy J C et al: "Status quo and open challenges in vision-based sensing and tracking of temporary resources on infrastructure construction sites", Advanced Engineering Informatics, Elsevier, Amsterdam, NL, vol. 29, No. 2, Apr. 20, 2015 (Apr. 20, 2015), pp. 225-238, XP029585845, ISSN: 1474-0346, DOI: 10.1016/J.AEI.2015.03.006.

Russel A. Carter: "Exploring the Dimensions of Digital Solutions in Mine Mapping", E&JM Engineering and Mining Journal, Jan. 31, 2013 (Jan. 31, 2013), pp. 40-43, XP055283257, Retrieved from the Internet: URL: http://emj.epubxp.com/i/102812-jan-2013 [retrieved on Jun. 23, 2016].

Sebastian Siebert et al. "Mobile 3D mapping for surveying earthwork projects using an Unmanned Aerial Vehicle (UAV) system", Automation in Construction, vol. 41, May 1, 2014, pp. 1-14, XP002763856.

* cited by examiner

CONSTRUCTION MACHINE WORK MANAGEMENT SYSTEM AND CONSTRUCTION MACHINE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/012829 filed on Mar. 29, 2017 and designating the U.S., which claims priority to Japanese Patent Application No. 2016-073111 filed on Mar. 31, 2016 and Japanese Patent Application No. 2017-006611 filed on Jan. 18, 2017. The entire contents of the foregoing applications are incorporated herein by reference.

BACKGROUND OF THE INVENTION

1. Field of the Invention

The present invention relates to a construction machine work management system and a construction machine.

2. Description of the Related Art

An excavator that generates topographical information using trajectory information of a cutting edge of a bucket derived based on an output of a stroke sensor is known (see e.g., Japanese Unexamined Patent Publication No. 2014-129676).

However, the topographical information generated by the excavator described in Japanese Unexamined Patent Publication No. 2014-129676 does not reflect topographical changes that cannot be determined from the trajectory information of the cutting edge of the bucket, such as soil spilled from the bucket, soil that has crumbled naturally, and the like.

In this respect, a construction machine work management system that is capable of generating topographical information reflecting topographical changes that cannot be determined from trajectory information of a work element is desired.

SUMMARY OF THE INVENTION

According to one embodiment of the present invention, a construction machine management system including a construction machine, an aircraft equipped with a camera, and a management device is provided. The construction machine management system includes a processor configured to execute a program stored in a memory to implement processes of specifying a progress region within a work site on which work progress has been made by the construction machine, and setting up a flight path of the aircraft so that the camera of the aircraft can capture an image of the progress region.

According to another embodiment of the present invention, a construction machine including an attachment that is coated with a stress luminescent coating material is provided.

DESCRIPTION OF THE PREFERRED EMBODIMENTS

In the following, embodiments of the present invention will be described with reference to the accompanying drawings.

Figure 1:
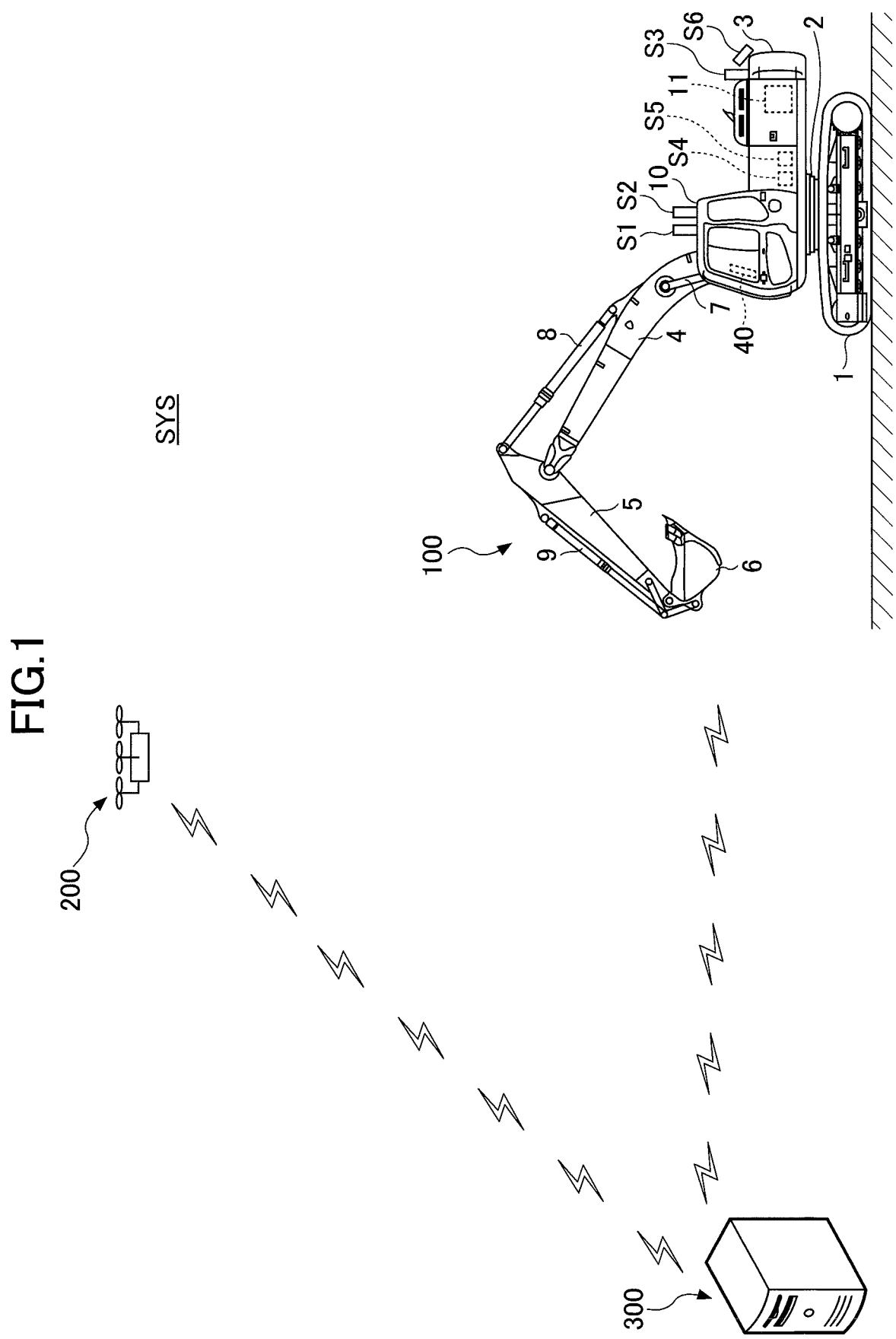
FIG. 1 is a schematic diagram illustrating an example overall configuration of a work management system.
Figure 2:
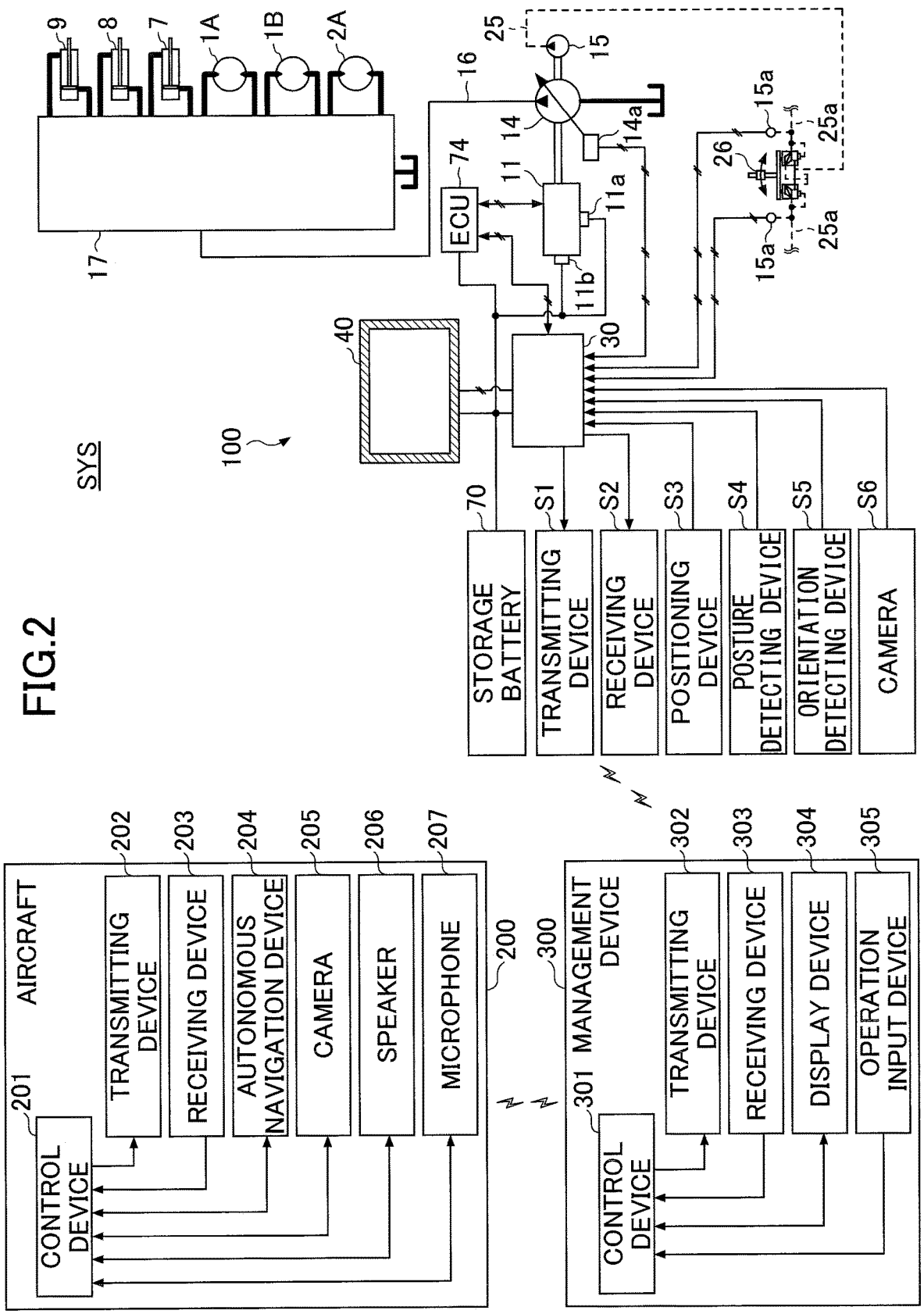
FIG. 2 is a diagram illustrating an example system configuration of the work management system.

First, with reference to FIGS. 1 and 2, a work management system SYS including an excavator 100 as a construction machine according to an embodiment of the present invention and an aircraft 200 will be described. FIG. 1 is a schematic diagram showing an example configuration of the work management system SYS. FIG. 2 is a system configuration diagram of the work management system SYS.

The work management system SYS is a system for managing work performed by an excavator using an aircraft, and is mainly configured by the excavator 100, the aircraft 200, and a management device 300. The number of the excavator 100 and the number of the aircraft 200 included in the work management system SYS may be one or plural. In the example of FIGS. 1 and 2, the work management system SYS includes one excavator 100 and one aircraft 200.

The aircraft 200 is an autonomous aircraft that is capable of flying by remote control or automatically. Examples of the aircraft 200 include a multicopter (drone), an airship, and the like. In the present embodiment, a quadcopter equipped with a camera is used as the aircraft 200.

The management device 300 is a device that manages work performed by the excavator 100, and may be implemented by a computer located outside a work site such as a management center, for example. The management device 300 may also be a portable computer that can be carried by a user, for example.

The excavator 100 includes a lower travelling body 1 and an upper turning body 3 that is pivotally mounted on the lower travelling body 1 via a turning mechanism 2. A boom 4 is attached to the upper turning body 3. An arm 5 is attached to the tip of the boom 4, and a bucket 6 is attached to the tip of the arm 5. The boom 4, the arm 5, and the bucket 6 corresponding to work elements constitute an excavating attachment, which is an example of an attachment. The boom 4, the arm 5, and the bucket 6 are hydraulically driven by a boom cylinder 7, an arm cylinder 8, and a bucket cylinder 9, respectively. The upper turning body 3 includes a cabin 10 and a power source such as an engine 11.

As shown in FIG. 2, the excavator 100 includes the engine 11, a main pump 14, a pilot pump 15, a control valve 17, an operation device 26, a controller 30, an engine control device 74, and the like.

The engine 11 is a driving source of the excavator 100 and may be implemented by a diesel engine that operates to maintain a predetermined rotational speed, for example. An output shaft of the engine 11 is connected to input shafts of the main pump 14 and the pilot pump 15.

The main pump 14 is a swash-plate variable displacement hydraulic pump that supplies hydraulic oil to the control valve 17 via a hydraulic oil line 16. In the main pump 14, the discharge flow rate per rotation changes in accordance with a change in the swash plate tilt angle. The swash plate tilt angle is controlled by a regulator 14a. The regulator 14a changes the swash plate tilt angle in accordance with a change in the control current from the controller 30.

The pilot pump 15 is a fixed displacement hydraulic pump that supplies hydraulic oil to various hydraulic control devices, such as the operation device 26, via a pilot line 25.

The control valve 17 is a set of flow control valves for controlling the flow of hydraulic fluid with respect to hydraulic actuators. The control valve 17 can selectively supply hydraulic oil received from the main pump 14 through the hydraulic oil line 16 to one or more hydraulic actuators in accordance with a change in pilot pressure based on the operation direction and the operation amount of the operation device 26. The hydraulic actuators may include the boom cylinder 7, the arm cylinder 8, the bucket cylinder 9, a left travelling hydraulic motor 1A, a right travelling hydraulic motor 1B, and a turning hydraulic motor 2A, for example.

The operation device 26 is a device used by the operator of the excavator 100 to operate the hydraulic actuators. The operation device 26 receives a supply of hydraulic fluid from the pilot pump 15 via the pilot line 25 and generates the pilot pressure. In turn, the pilot pressure is applied to a pilot port of a corresponding flow control valve through a pilot line 25a. The pilot pressure changes in accordance with the operation direction and the operation amount of the operation device 26. A pilot pressure sensor 15a detects the pilot pressure and outputs the detected value to the controller 30.

The controller 30 is a control device for controlling the excavator 100. In the present embodiment, the controller 30 is implemented by a computer including a CPU, a RAM, a ROM, and the like. The CPU of the controller 30 reads programs corresponding to various functions from the ROM, loads the programs into the RAM, and executes the programs to thereby implementing functions corresponding to the programs.

The engine control device 74 can control the engine 11. For example, the engine control device 74 can control the fuel injection amount so that the engine 11 operates at the engine speed that has been set up via an input device.

A transmitting device S1, a receiving device S2, a positioning device S3, a posture detecting device S4, an orientation detecting device S5, a camera S6, and a display device 40 that are attached to the upper turning body 3 are connected to the controller 30. The controller 30 can execute various computations based on information output by the receiving device S2, the positioning device S3, the posture detecting device S4, the orientation detecting device S5, and the camera S6. The controller 30 can then generate information based on the computation results and transmit the generated information to the exterior via the transmitting device S1 or display the generated information on the display device 40, for example.

The transmitting device S1 can transmit information from the excavator 100 to the exterior. For example, the transmitting device S1 may transmit information receivable by at least one of the aircraft 200 and the management device 300. In the present embodiment, the transmitting device S1 transmits information receivable by the management device 300 to the management device 300 in response to a request from the management device 300.

The receiving device S2 can receive information from the exterior of the excavator 100. For example, the receiving device S2 may receive information transmitted by at least one of the aircraft 200 and the management device 300. In the present embodiment, the receiving device S2 receives information transmitted from the management device 300.

The positioning device S3 can acquire position information relating to the position of the excavator 100. In the present embodiment, the positioning device S3 is a GNSS (GPS) receiver that measures the latitude, longitude, and altitude of the excavator 100.

The posture detecting device S4 can detect the posture of the excavator 100. The posture of the excavator 100 may be the posture of the excavating attachment, for example. In the present embodiment, the posture detecting device S4 includes a boom angle sensor, an arm angle sensor, a bucket angle sensor, and a machine frame tilt sensor. The boom angle sensor is a sensor that acquires the boom angle. The boom angle sensor may include a rotation angle sensor that detects the rotation angle of a boom foot pin, a stroke sensor that detects the stroke amount of the boom cylinder 7, a tilt (acceleration) sensor that detects the tilt angle of the boom 4, and the like. The boom angle sensor may also be a combination of an acceleration sensor and a gyro sensor, for example. Note that the arm angle sensor and the bucket angle sensor may have similar sensor configurations as the boom angle sensor. The machine frame tilt sensor is a sensor that acquires the machine frame tilt angle of the excavator 100. For example, the machine frame tilt sensor may detect the tilt angle of the upper turning body 3 with respect to the horizontal plane. In the present embodiment, the machine frame tilt sensor is a two-axis acceleration sensor that detects tilt angles around a longitudinal axis and a lateral axis of the upper turning body 3. The longitudinal axis and the lateral axis of the upper turning body 3 may intersect perpendicularly at a center point of the excavator 100 corresponding to a point on a turning axis of the excavator 100, for example. The machine frame tilt sensor may also be three-axis acceleration sensor, for example.

The orientation detecting device S5 can detect the orientation of the excavator 100. The orientation detecting device S5 may include a geomagnetic sensor, a resolver or an encoder relating to the turning axis of the turning mechanism 2, and a gyro sensor, for example. In the present embodiment, the orientation detecting device S5 is implemented by a combination of a three-axis geomagnetic sensor and a gyro sensor.

The controller 30 can acquire trajectory information of the tip of the bucket 6 based on outputs of the positioning device S3, the posture detecting device S4, and the orientation detecting device S5.

The controller 30, the display device 40, the engine control device 74, and the like operate by receiving electric power supply from a storage battery 70. The storage battery 70 is charged by a generator 11a that is driven by the engine 11. The electric power of the storage battery 70 is also supplied to a starter 1b of the engine and the like. The starter 11b is driven by the electric power from the storage battery 70 to start the engine 11.

The camera S6 is attached to the upper turning body 3 and is capable of capturing images of the periphery of the excavator 100. In the present embodiment, the camera S6 includes a backside camera for capturing an image of a space behind the excavator 100, a right side camera for capturing an image of a space on the right side of the excavator 100, and a left side camera for capturing an image of a space on the left side of the excavator 100.

The display device 40 is a device for displaying various types of information and is arranged in the vicinity of the driver's seat in the cabin 10. In the present embodiment, the display device 40 can display an image captured by the camera S6 and an image captured by the aircraft 200. The image captured by the camera S6 includes a composite image obtained by combining captured images of a plurality of cameras. The composite image may be obtained using various image processing techniques such as viewpoint conversion processing and the like, for example.

The aircraft 200 includes a control device 201, a transmitting device 202, a receiving device 203, an autonomous navigation device 204, a camera 205, a speaker 206, a microphone 207, and the like.

The control device 201 is a device for controlling the aircraft 200. In the present embodiment, the control device 201 is implemented by a computer including a CPU, a RAM, a ROM, and the like. The CPU of the control device 201 can implement various functions corresponding to programs stored in the RAM by reading one or more of the programs from the ROM and loading the programs in the RAM to execute the programs.

The transmitting device 202 can transmit information from the aircraft 200 to the exterior. For example, the transmitting device 202 may transmit information receivable by at least one of the excavator 100 and the management device 300. In the present embodiment, the transmitting device 202 repeatedly transmits information receivable by the excavator 100 and the management device 300 at predetermined intervals. The information receivable by the excavator 100 and the management device 300 may include a captured image captured by the camera 205, for example.

The receiving device 203 can receive information from the exterior of the aircraft 200. For example, the receiving device 203 may receive information transmitted by the excavator 100 and information transmitted by the management device 300.

The autonomous navigation device 204 is a device for enabling autonomous navigation of the aircraft 200. In the present embodiment, the autonomous navigation device 204 includes a flight control device, an electric motor, and a battery. The flight control device includes various sensors such as a gyro sensor, an acceleration sensor, a geomagnetic sensor (azimuth sensor), an atmospheric pressure sensor, a positioning sensor, an ultrasonic sensor, and the like to implement a posture maintaining function, an altitude maintaining function, and the like. The electric motor receives an electric power supply from the battery to rotate one or more propellers. For example, when the autonomous navigation device 204 receives information relating to a flight path from the control device 201, the autonomous navigation device 204 may separately control the rotation speeds of four propellers and control the aircraft 200 to move along the flight path while maintaining the posture and altitude of the aircraft 200. The information relating to the flight path may include information on the latitude, longitude, and altitude of the flight position, for example. The control device 201 may acquire the information relating to the flight path from an external source via the receiving device 203, for example.

The autonomous navigation device 204 may also change the orientation of the aircraft 200 upon receiving orientation information relating to the orientation from the control device 201, for example.

The camera 205 is a device for capturing images. In the present embodiment, the camera 205 is attached to the aircraft 200 so that it can capture an image directly below the aircraft 200. A captured image captured by the camera 205 may include information on an image capturing position corresponding to the flight position of the aircraft 200, for example, and such information may be used to generate three-dimensional topographical data. Note that the camera 205 may be a monocular camera or a stereo camera.

The speaker 206 is a device that outputs audio to the exterior. In the present embodiment, the speaker 206 may be used to transmit audio information to a person at a work site, for example.

The microphone 207 is a device that receives audio from the exterior. In the present embodiment, the microphone 207 may be used to acquire audio generated by a person at a work site, for example.

The management device 300 includes a control device 301, a transmitting device 302, a receiving device 303, a display device 304, an operation input device 305, and the like.

The control device 301 is a device for controlling the management device 300. In the present embodiment, the control device 301 may be implemented by a computer including a CPU, a RAM, a ROM, and the like. The CPU of the control device 301 can implement various functions corresponding to programs stored in the ROM by reading the programs from the ROM and loading the programs into the RAM to execute the programs.

The transmitting device 302 can transmit information to the exterior of the management device 300. For example, the transmitting device 302 may repeatedly transmit information receivable by the aircraft 200 at predetermined intervals. The transmitting device 302 may also transmit information receivable by the excavator, for example. In the present embodiment, the transmitting device 302 repeatedly transmits information receivable by the aircraft 200 at predetermined intervals. The information receivable by the aircraft 200 may include information relating to the flight path of the aircraft 200, for example.

The receiving device 303 can receive information from the exterior of the management device 300. The receiving device 303 may receive information transmitted by at least one of the excavator 100 and the aircraft 200, for example. In the present embodiment, the receiving device 303 receives information transmitted by the aircraft 200. The information transmitted by the aircraft 200 may include a captured image captured by the camera 205 of the aircraft 200, for example.

The display device 304 is a device for displaying various types of information. In the present embodiment, the display device 304 is a liquid crystal display that displays information relating to work performed by the excavator 100, information relating to topographical data, information relating to operation of the aircraft 200, and the like. The display device 304 may also display a captured image captured by the camera 205 of the aircraft 200, for example.

The operation input device 305 is a device for receiving an operation input. In the present embodiment, the operation input device 305 is implemented by a touch panel arranged on a liquid crystal display.

Figure 3:
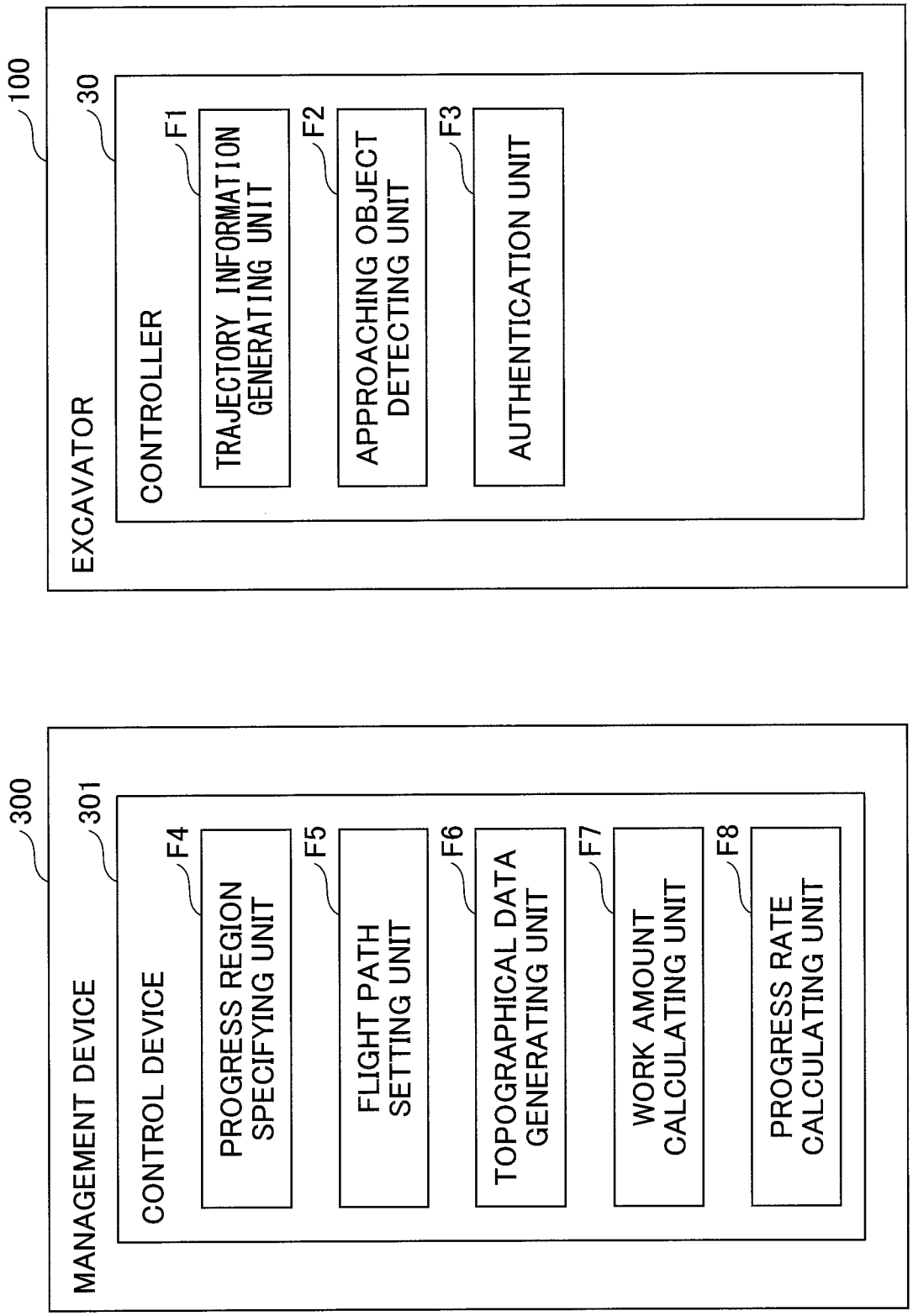
FIG. 3 is a functional block diagram of the work management system.

In the following, various functional elements of the work management system SYS will be described with reference to FIG. 3. FIG. 3 is a functional block diagram of the work management system SYS. The work management system SYS mainly includes a trajectory information generating unit F1, an approaching object detecting unit F2, an authentication unit F3, a progress region specifying unit F4, a flight path setting unit F5, a topographical data generating unit F6, a work amount calculating unit F7, and a progress rate calculating unit F8. In the present embodiment, the controller 30 of the excavator 100 includes the trajectory information generating unit F1, the approaching object detecting unit F2, and the authentication unit F3, and the control device 301 of the management device 300 includes the progress region specifying unit F4, the flight path setting unit F5, the topographical data generating unit F6, the work amount calculating unit F7, and the progress rate calculating unit F8. However, each of the above functional elements may be included in either the controller 30 or the control device 301. The above functional elements may also be included in the control device 201 of the aircraft 200, for example.

The trajectory information generating unit F1 can generate trajectory information relating to a trajectory followed by a predetermined portion of the attachment. In the present embodiment, the trajectory information generating unit F1 stores time series data of position information (latitude, longitude, and altitude) of the tip of the bucket 6 in a nonvolatile storage medium or the like as trajectory information relating to the trajectory followed by the tip of the bucket 6. The position information of the tip of the bucket 6 may be acquired based on outputs of the positioning device S3, the posture detecting device S4, and the orientation detecting device S5, for example.

The approaching object detecting unit F2 can detect an object entering a predetermined region of the work site. An object may be a person, a dump, or the like. In the present embodiment, the approaching object detecting unit F2 detects a person entering a predetermined region of the work site by performing various image recognition processes on a captured image captured by the camera S6 attached to the excavator 100. The approaching object detecting unit F2 may also detect a person entering the predetermined region using a captured image captured by a camera installed at an entrance/exit gate of the work site or a captured image captured by the camera 205 of the aircraft 200, for example. In the case of using a captured image captured by a camera installed at the entrance/exit gate of the work site, the camera is connected to at least one of the excavator 100 and the management device 300 via wireless communication or the like.

The authentication unit F3 can authenticate the entering person detected by the approaching object detecting unit F2. In the present embodiment, the entering person may be authenticated when the authentication unit F3 confirms that the entering person is a registered person based on a face image of the entering person included in the captured image of the camera S6 attached to the excavator 100. The captured image may also be a captured image captured by a camera installed at the entrance/exit gate of the work site or a captured image captured by the camera 205 of the aircraft 200, for example. The determination as to whether the entering person is a registered person may be implemented by the authentication unit F3 through machine learning by providing the authentication unit F3 with existing images of registered persons, such as photographs included in employee ID cards, for example.

The authentication unit F3 may also authenticate the entering person using authentication methods other than face image authentication. Other authentication methods that may be used include, for example, card authentication or tag authentication using a card reader or an IC tag reader installed at the entrance/exit gate of the work site, pose authentication using image recognition to authenticate an entering person upon detecting that the entering user has taken a predetermined pose, and password authentication using audio recognition to authenticate an entering person upon detecting that the entering person has uttered a predetermined password, for example.

The progress region specifying unit F4 can specify a progress region within the work site on which the excavator 100 has made work progress over a predetermined time period. In the present embodiment, the progress region specifying unit F4 specifies a progress region by determining a region passed by the tip of the bucket 6 since a last progress region was specified based on trajectory information generated after the last progress region was specified. The progress region may be specified using a plurality of sets of position information (latitude, longitude, and altitude) to derive its boundaries, for example.

The flight path setting unit F5 can set up a flight path of the aircraft 200. In the present embodiment, the flight path setting unit F5 sets up the flight path of the aircraft 200 so that the camera 205 of the aircraft 200 can capture an image of the progress region specified by the progress region specifying unit F4. More specifically, the flight path setting unit F5 sets up the flight path of the aircraft 200 so that the topographical data generating unit F6 can generate three-dimensional topographical data of the progress region based on the captured image captured by the camera 205.

Also, when a person not authenticated by the authentication unit F3 (hereinafter referred to as "unauthenticated person") enters the predetermined region within the work site, the flight path setting unit F5 may be configured to set up the flight path of the aircraft 200 so that the aircraft 200 directs itself toward the unauthenticated person, for example.

In this case, the aircraft 200 may follow the flight path set up by the flight path setting unit F5 to fly from a parking lot into the sky above the unauthenticated person, for example. Then, the aircraft 200 may use the speaker 206 to output an audio message prompting the unauthenticated person to leave the predetermined region. Alternatively, the aircraft 200 may have the camera 205 capture an image to be used for face image authentication or pose authentication, for example. Alternatively, the aircraft 200 may use the speaker 206 to output an audio message prompting the unauthenticated person to utter a password for password authentication, for example. In this case, the aircraft 200 may operate the microphone 207 to collect the voice of the unauthenticated person uttering the password, for example. Note that when the person is successfully authenticated through face image authentication, pose authentication, password authentication, or the like (hereinafter referred to as "authenticated person"), the aircraft 200 may return to the parking lot without outputting the audio message prompting the person to leave the predetermined region, for example.

The topographical data generating unit F6 can generate three-dimensional topographical data of the work site. In the present embodiment, the topographical data generating unit F6 generates current three-dimensional topographical data of the current work site (work site under construction) based on three-dimensional topographical data of the work site before construction and three-dimensional topographical data of the progress region.

The three-dimensional topographical data of the work site before construction may be generated based on total station survey measurements, GNSS survey measurements, or the like, for example. The three-dimensional topographical data of the work site before construction may also be generated based on an image of the entire work site captured by the camera 205 of the aircraft 200, for example.

The topographical data generating unit F6 generates three-dimensional topographical data relating to a progress region based on an image of the progress region captured by the camera 205 of the aircraft 200.

Then, the topographical data generating unit F6 generates current three-dimensional topographical data of the current work site by joining the three-dimensional topographical data relating to the progress region and three-dimensional topographical data relating to regions other than the progress region. Note that the three-dimensional topographical data of the work site before construction or three-dimensional topographical data previously generated by the topographical data generating unit F6 may be used as is as the three-dimensional topographical data relating to regions other than the progress region. This is because it can be presumed that regions other than the progress region remain unchanged.

Note that the topographical data generating unit F6 may generate the current three-dimensional topographical data of the current work site using three-dimensional topographical data relating to a plurality of progress regions generated by a plurality of excavators, for example.

Also, when the topographical data generating unit F6 determines through various image processing that a known object such as an excavator or a dump is present within a part of the progress region, the topographical data generating unit F6 may be configured to refrain from generating three-dimensional topographical data relating to the part of the progress region at that time, for example. In such case, the topographical data generating unit F6 may reacquire an image of the part of the progress region at a different time to generate the three-dimensional topographical data relating to the part of the progress region, for example. This is to prevent the known object from being treated as part of the topography to thereby adversely affect calculation of the work amount, the progress rate, and the like. In the case of displaying the three-dimensional topographical data relating to the part of the progress region before reacquiring an image of the part of the progress region, a message such as "work in progress" may be displayed at the same time, for example. In the case of storing the three-dimensional topographical data relating to the part of the progress region before reacquiring an image of the part of the progress region, information such as a flag indicating that generation of the three-dimensional topographical data relating to the part of the progress region is still in progress may be stored at the same time, for example.

Also, the topographical data generating unit F6 may be configured to refrain from calculating the work amount, the progress rate, and the like until an image of the part of the progress region is newly acquired, for example. In this case, a message such as "waiting for data acquisition" or the like may be displayed where the work amount, the progress rate, and the like should be displayed. Alternatively, if the work amount, the progress rate, and the like are calculated before reacquiring an image of the part of the progress region, a message indicating that the calculated values being displayed are provisional values may be displayed at the same time, for example.

The work amount calculating unit F7 can calculate the work amount of the excavator 100 based on the three-dimensional topographical data of the work site. For example, the work amount calculating unit F7 may calculate the cumulative work amount of the excavator 100 after starting construction by deriving the volume of soil excavated from the difference between the three-dimensional topographical data of the work site before construction and the current three-dimensional topographical data of the current work site generated by the topographical data generating unit F6. Alternatively, the work amount calculating unit F7 may calculate the work amount of the excavator 100 over a period from a first time to a second time by deriving the volume of soil excavated during this time period from the difference between three-dimensional topographical data of the work site at the first time generated by the topographical data generating unit F6 and three-dimensional topographical data of the work site at the second time generated by the topographical data generating unit F6, for example.

The progress rate calculating unit F8 can calculate the progress rate of work performed by the excavator 100 based on the three-dimensional topographical data of the work site. For example, the progress rate calculating unit F8 may calculate a value obtained by dividing the cumulative work amount of the excavator 100 by a target work amount as the progress rate. The target work amount may be obtained by deriving the volume of soil to be excavated from the difference between the three-dimensional topographical data of the work site before construction and three-dimensional topographical data of the work site when construction is completed (target topographical data), for example.

Also, the progress rate calculating unit F8 may calculate the progress rate of collaborative work performed by a plurality of excavators based on three-dimensional topographical data of the work site. For example, the progress rate calculating unit F8 may calculate a value obtained by dividing the total cumulative work amounts of the plurality of excavators by the target work amount as the progress rate of the collaborative work performed by the plurality of excavators.

Figure 4:
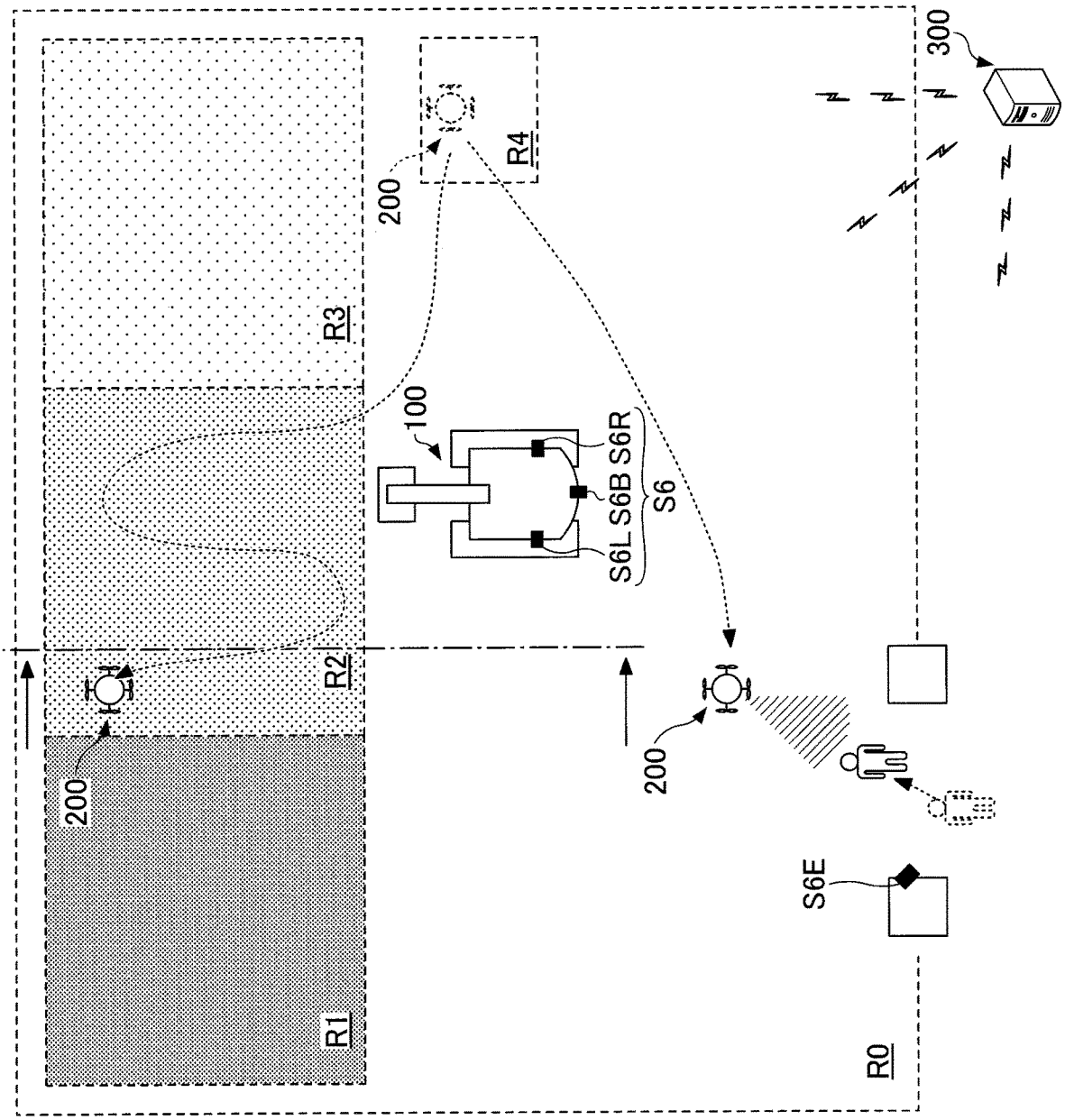
FIG. 4 is a top view of a work site.
Figure 5:
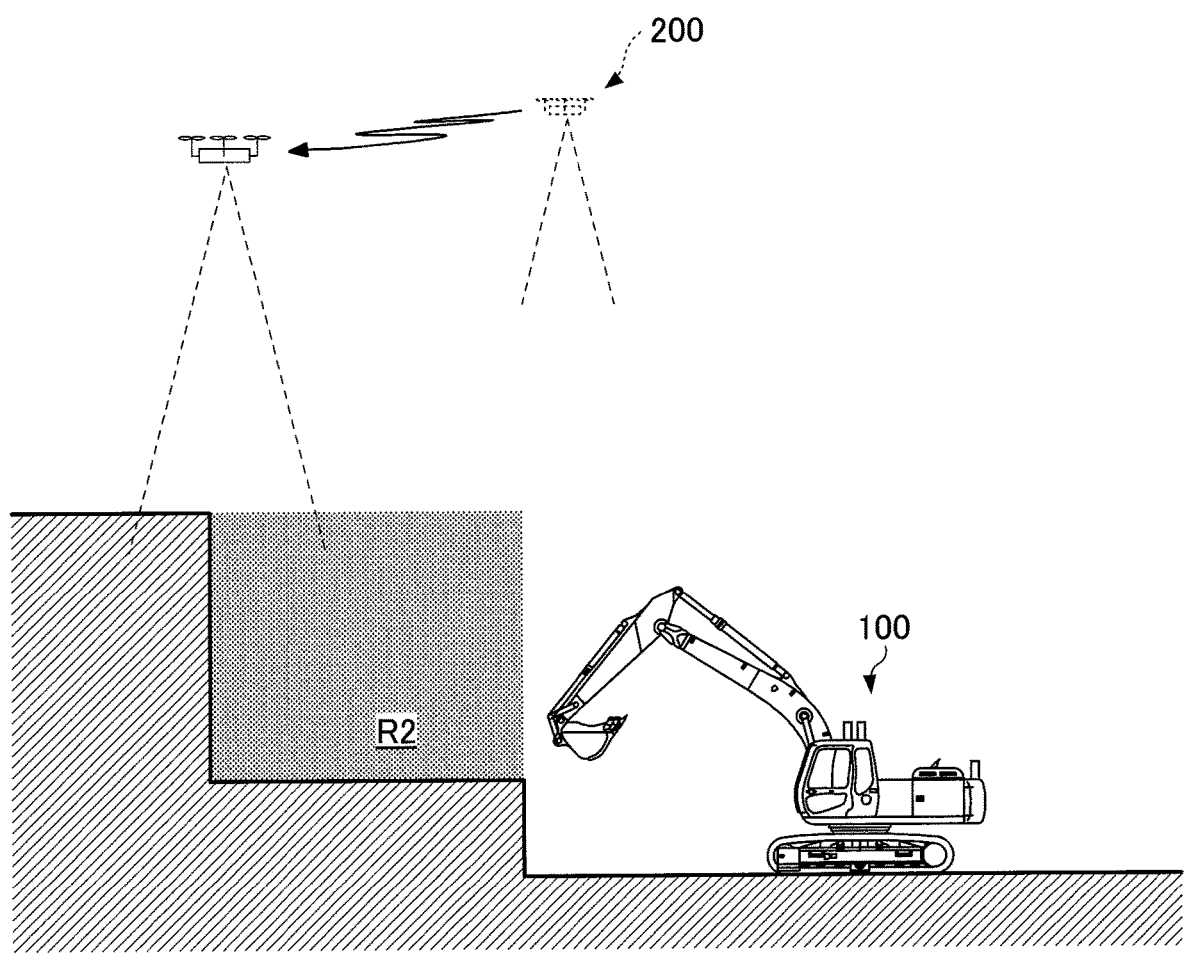
FIG. 5 is a partial cross-sectional view of the work site.

In the following, the topographical data generating function of the work management system SYS will be described with reference to FIGS. 4 and 5. FIG. 4 is a top view of a work site R0 at the time work for the morning has been completed. FIG. 5 is a partial cross-sectional view of the work site R0 that represents a cross-sectional plane across the one dot chain line shown in FIG. 4 viewed from the direction of the arrows shown in FIG. 4. In FIG. 4, region R1 represents a region that already has its topographical changes reflected in three-dimensional topographical data (e.g., region worked on yesterday) from among the regions that have been worked on by the exactor 100. Region R2 represents a region that does not yet have its topographical changes reflected in three-dimensional topographical data (e.g., region worked on this morning) from among the regions that have been worked on by the exactor 100. Region R3 represents a part of the regions that have not yet been worked on by the excavator 100 (e.g., region to be worked on this afternoon). Region R4 represents the parking lot for the aircraft 200. The ranges indicated by the broken lines in FIG. 5 represent image capturing ranges of the camera 205 of the aircraft 200.

The control device 301 of the management device 300 determines whether the engine 11 of the excavator 100 has been stopped based on information transmitted by the excavator 100 and acquired via the receiving device 303. When it is determined that the engine 11 has stopped, the progress region specifying unit F4 of the control device 301 specifies region R2 corresponding to the progress region within the work site R0 on which work progress was made by the excavator 100 this morning. Specifically, the progress region specifying unit F4 acquires trajectory information stored by the trajectory information generating unit F1 of the controller 30 during operation of the excavator 100 and specifies region R2 based on the acquired trajectory information.

Then, the flight path setting unit F5 of the control device 301 sets up the flight path of the aircraft 200 so that the camera 205 of the aircraft 200 can capture an image of region R2 as the progress region specified by the progress region specifying unit F4. Then, the control device 301 transmits information relating to the flight path to the aircraft 200 via the transmitting device 302.

Upon receiving the information relating to the flight path, the aircraft 200 flies from the parking lot into the sky above region R2 and captures an image of region R2 with the camera 205 while flying over the region R2 along the flight path. The aircraft 200 transmits the captured image to the management device 300 via the transmitting device 202.

Then, the topographical data generating unit F6 of the control device 301 generates three-dimensional topographical data relating to region R2 based on the image of region R2 captured by the camera 205 of the aircraft 200. Then, the topographical data generating unit F6 joins the three-dimensional topographical data relating to region R2 and three-dimensional topographical data relating to regions other than region R2 to generate the current three-dimensional topographical data of the current work site R0.

In the following, the entering person monitoring function of the work management system SYS will be described with reference to FIG. 4. When the excavator 100 is in operation, the work management system SYS may use the aircraft 200 to prompt an unauthenticated person that has entered the work site R0 to leave.

For example, the approaching object detecting unit F2 of the controller 30 of the excavator 100 may detect a person entering a predetermined region within the work site R0 by implementing various image recognition processes on a captured image captured by the camera S6 attached to the excavator 100. In the example of FIG. 4, the camera S6 includes a backside camera S6B, a left side camera S6L, and a right side camera S6R. The approaching object detecting unit F2 may also detect a person entering the work site R0 based on a captured image captured by a camera S6E installed at the entrance/exit gate of the work site R0, for example. In this case, the controller 30 acquires the captured image captured by the camera S6E via the transmitting device S1. Note that in some embodiments, the approaching object detecting unit F2 may be included in the control device 301 of the management device 300, for example. In this case, the control device 301 acquires the captured image captured by the camera S6E and the captured image captured by the camera S6 via the receiving device 303. Note that detection of an approaching object may also be implemented using some other sensor such as an infrared sensor, an ultrasonic sensor, or the like.

When a person entering the work site R0 is detected, the authentication unit F3 of the controller 30 tries to authenticate the entering person detected by the approaching object detecting unit F2. If the entering person cannot be authenticated, the authentication unit F3 notifies the management device 300 to that effect. If the entering person could be successfully authenticated, the authentication unit F3 may omit the above notification to the management device 300.

Upon receiving the notification that the entering person cannot be authenticated, the management device 300 directs the aircraft 200 to the entering person. Specifically, the flight path setting unit F5 of the control device 301 sets up the flight path of the aircraft 200 so that the aircraft 200 is directed to the unauthenticated person.

Upon receiving information relating to the flight path set up by the flight path setting unit F5, the aircraft 200 flies from the parking lot toward the entering person and attempts to authenticate the entering person. For example, the aircraft 200 may use the speaker 206 to prompt the entering person to utter a password and authenticate the entering person if the microphone 207 can recognize the password uttered by the entering person. The aircraft 200 may also authenticate the entering person through pose authentication, for example.

If the entering person cannot be authenticated, the aircraft 200 uses the speaker 206 to output an audio message prompting the entering person to leave the work site R0. If the entering person could be authenticated, the aircraft 200 may return to the parking lot without outputting such an audio message.

With the above configuration, the work management system SYS can efficiently and accurately manage work progress made by the excavator 100 based on a captured image captured by the camera 205 of the aircraft 200. Also, by generating three-dimensional topographical data using the camera 205 of the aircraft 200, total station surveying, GNSS surveying, or the like may be omitted, for example.

Also, because the operation management system SYS generates three-dimensional topographical data by having the aircraft 200 capture an image of only a progress region within the work site R0 on which work progress was made by the excavator 100 over a predetermined time period, efficient work progress management may be achieved, for example.

Also, the work management system SYS can detect an object such as a person, a dump, or the like that has entered a predetermined region within the work site R0 and can notify an operator of the excavator 100 or an administrator at a management center to that effect, for example.

Figure 6:
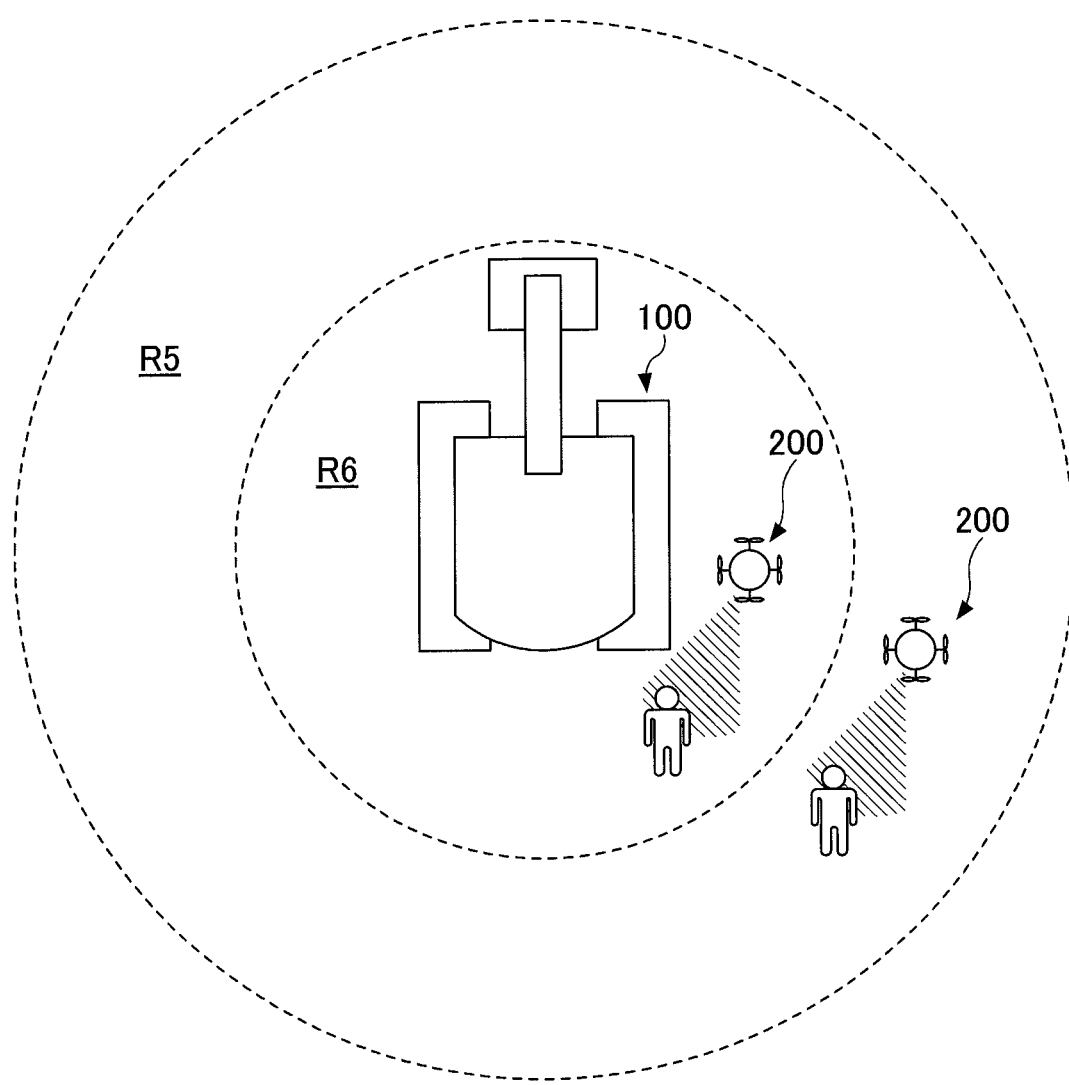
FIG. 6 is a top view of an excavator in operation at the work site.

In the following, an operator monitoring function of the work management system SYS will be described with reference to FIG. 6. FIG. 6 is a top view of the excavator 100 operating at a work site. FIG. 6 illustrates a first work range R5 represented by an annular region in between an outer dashed circle and an inner dashed circle, and a second work range R6 represented by a circular region within the inner dashed circle. The second work range R6 may correspond to the turning range of the excavator 100 (range that can be reached by the excavating attachment), for example. In the example of FIG. 6, the authentication unit F3 of the controller 30 of the excavator 100 classifies one or more authenticated persons as either a related person (worker) that is involved in the work being performed or a non-related person that is not involved in the work.

When the approaching object detecting unit F2 detects that an authenticated person classified as a related person has entered the first work range R5, the controller 30 may notify the operator of the excavator 100 to that effect via an in-vehicle speaker or the display device 40 installed in the cabin 10, for example. When the approaching object detecting unit F2 detects that an authenticated person classified as a non-related person has entered the first work range R5, the controller 30 notifies the operator of the excavator 100 to the effect and also notifies the management device 300 to that effect via the transmitting device S1.

Upon receiving the notification that a non-related person has entered the first work range R5, the management device 300 directs the aircraft 200 to the non-related person. Specifically, the flight path setting unit F5 of the control device 301 sets up the flight path of the aircraft 200 so that the aircraft 200 is directed to the non-related person.

Upon receiving information relating to the flight path set up by the flight path setting unit F5, the aircraft 200 flies from the parking lot toward the non-related person and uses the speaker 206 to output an audio message prompting the non-related person to leave the first work range R5, for example.

When the approaching object detecting unit F2 detects that an authenticated person classified as a related person has entered the second work range R6, the controller 30 notifies the operator of the excavator 100 to that effect via the in-vehicle speaker or the display device 40 installed in the cabin 10, for example. In this case, the controller 30 may notify the operator of the excavator 100 to that effect in a mode that is different from that used in the case where the related person has entered the first work range R5 (e.g., a different audio message, larger volume, larger display, or the like). Also, movement of the excavator 100 may be restricted, for example.

When the approaching object detecting unit F2 detects that an authenticated person classified as a non-related person has entered the second work range R6, the controller 30 notifies the operator of the excavator 100 to that effect and also notifies the management device 300 to that effect via the transmitting device S1. The controller 30 may also use a speaker installed outside the cabin 10 to output an audio message prompting the non-related person to leave the second work range R6, for example.

Upon receiving the notification that a non-related person has entered the second work range R6, the management device 300 directs the aircraft 200 to the non-related person. Specifically, the flight path setting unit F5 of the control device 301 sets up the flight path of the aircraft 200 so that the aircraft 200 is directed to the non-related person.

Upon receiving information relating to the flight path set up by the flight path setting unit F5, the aircraft 200 flies from the parking lot toward the non-related person and uses the speaker 206 to output an audio message prompting the non-related person to leave the second work range R6. In this case, the aircraft 200 may output the audio message toward the non-related person in a mode different from that used in the case where the non-related person has entered the first work range R5 (e.g., different audio message, larger volume, closer flight, or the like).

With the above configuration, the work management system SYS can achieve the effects as described above with reference to FIGS. 4 and 5 and can also reliably prompt a non-related person to leave a predetermined region within the work site without unduly bothering the operator of the excavator 100 or a related person (worker), for example.

Figure 7:
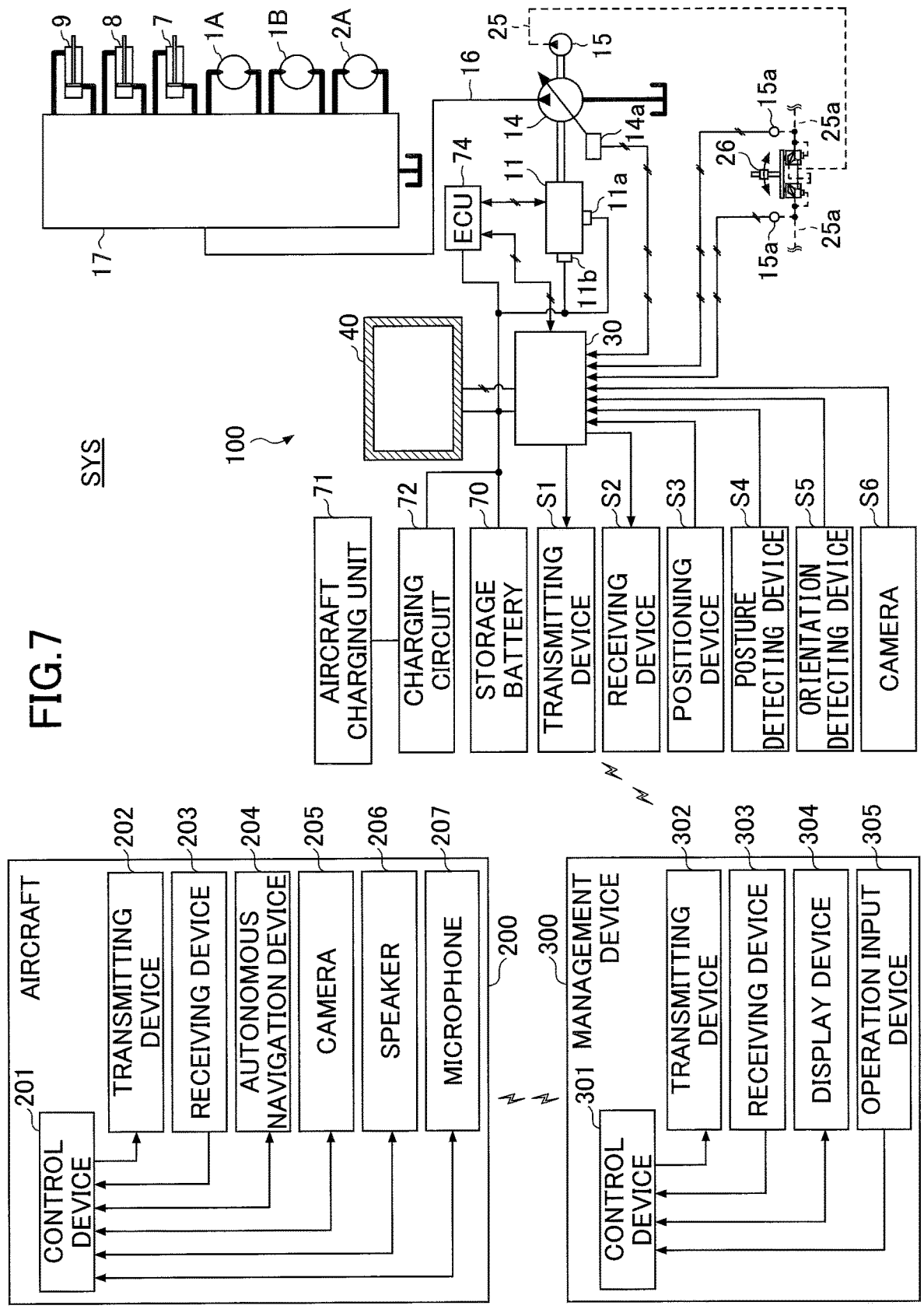
FIG. 7 is a diagram illustrating another example system configuration of the work management system.

In the following, another example configuration of the work management system will be described with reference to FIG. 7. FIG. 7 is a system configuration diagram showing another example configuration of the work management system SYS. The work management system SYS of FIG. 7 differs from the work management system SYS of FIG. 2 in that the excavator 100 includes an aircraft charging unit 71 and a charging circuit 72.

The aircraft charging unit 71 is a mechanism that receives the aircraft 200 and fixes it in place so that the aircraft 200 can be charged. In the example of FIG. 7, the aircraft charging unit 71 is installed on the upper face of the upper turning body 3 so that the aircraft 200 can autonomously land on the aircraft charging unit 71. For example, the aircraft 200 may use a captured image captured by the camera 205 to determine the location of the aircraft charging unit 71 and automatically land on the aircraft charging unit 71. Also, the aircraft charging unit 71 may be configured to lock the aircraft 200 in place so that the aircraft 200 would not be shaken off during operation of the excavator 100, for example. On the other hand, when the aircraft 200 has to take off, such as when an entering person is detected, the lock can be released.

When the aircraft 200 has landed on the aircraft charging unit 71 and has been locked in place by the aircraft charging unit 71, the camera 205 may function as the camera S6, for example.

The charging circuit 72 is an electric circuit for charging the battery of the aircraft 200 that has landed on the aircraft charging unit 71. The aircraft 200 that has landed on the aircraft charging unit 71 and is locked in place by the aircraft charging unit 71 can receive electric power from the storage battery 70 of the excavator 100 via the charging circuit 72. In this way, the aircraft 200 can receive electric power from the storage battery 70 and operate a flight control device including various sensors such as a gyro sensor, an acceleration sensor, a geomagnetic sensor (azimuth sensor), an atmospheric pressure sensor, a positioning sensor, an ultrasonic sensor, and the like. In this case, the excavator 100 may use the outputs of the various sensors included in the flight control device, for example.

With the above configuration, the work management system SYS can achieve the effects described above with reference to FIGS. 4 to 6 and can also achieve an additional effect of being able to operate the aircraft 200 using a power supply of the excavator 100.

Figure 8:
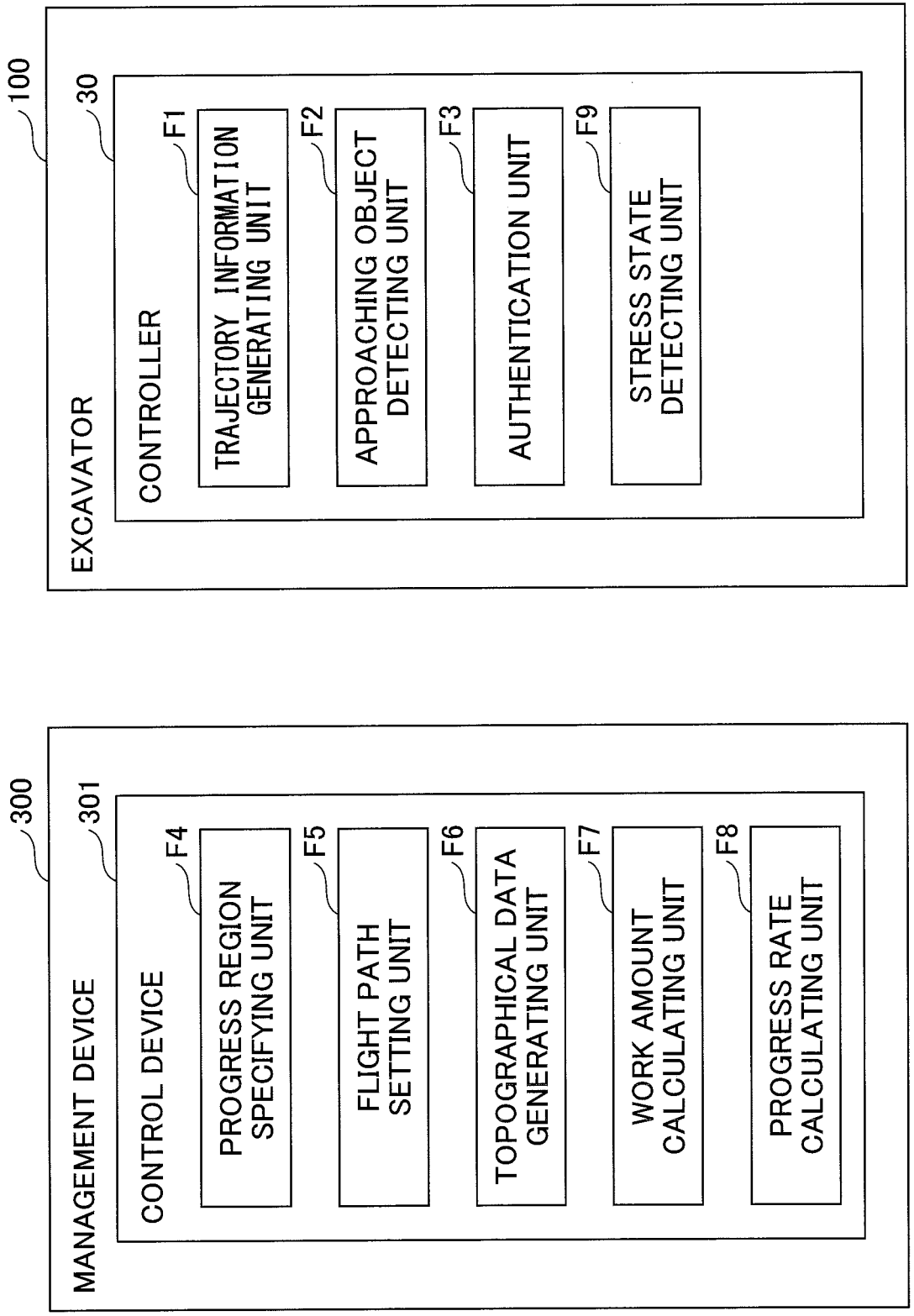
FIG. 8 is a functional block diagram of yet another example of the work management system.
Figure 9:
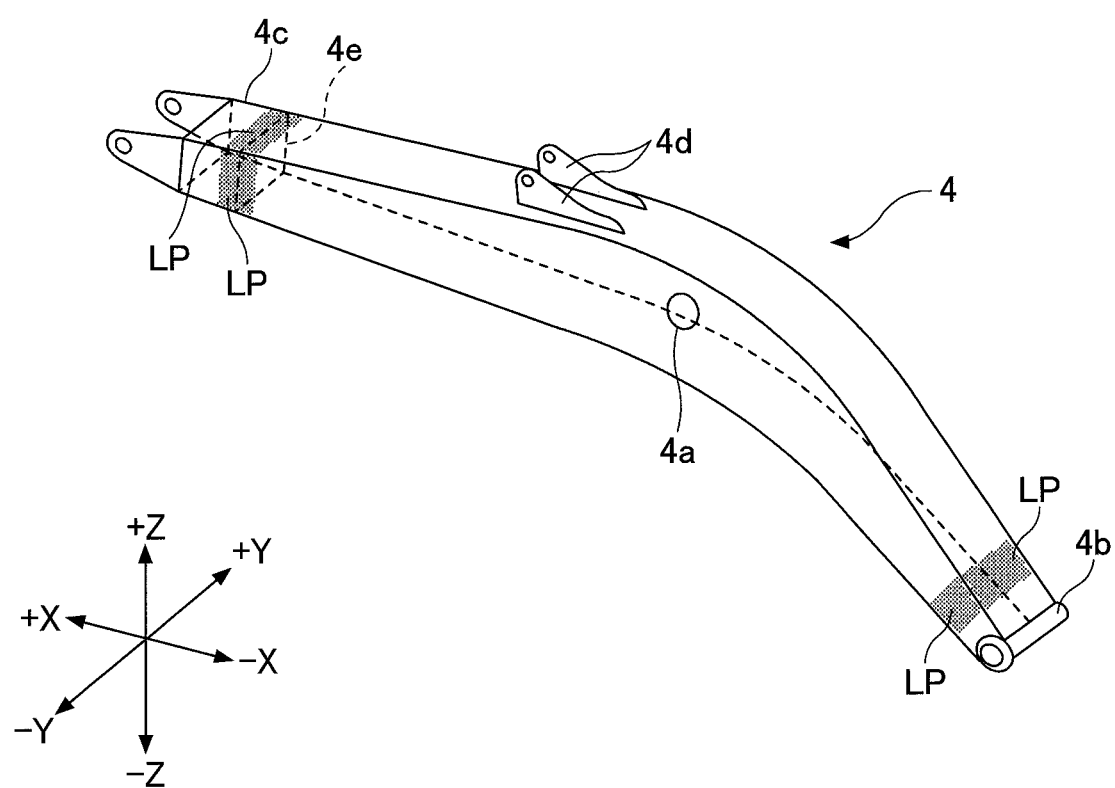
FIG. 9 is a perspective view of a boom coated with stress luminescent coating material.

In the following, another example configuration of the work management system SYS will be described with reference to FIGS. 8 and 9. FIG. 8 is a functional block diagram showing another example configuration of the work management system SYS. FIG. 9 is a perspective view of the boom 4 of the excavator 100 included in the work management system SYS. The controller 30 of the excavator 100 shown in FIG. 8 differs from the controller 30 shown in FIG. 3 in that it includes a stress state detecting unit F9. The boom 4 shown in FIG. 9 differs from the boom 4 shown in FIG. 1 in that it is coated with a stress luminescent coating material LP. Note that in other example configurations, the control device 301 may include the stress state detecting unit F9 or the control device 201 of the aircraft 200 may include the stress state detecting unit F9, for example.

The stress state detecting unit F9 can detect a state of stress acting on a component of the construction machine. In the present embodiment, the stress state detecting unit F9 detects the state of stress acting on the boom 4 based on an image of the boom 4 that is coated with the stress luminescent coating material LP. Note that the component of the construction machine to which stress state detection is implemented may also be some other component such as the frame of the lower travelling body 1 or the arm 5, for example.

The stress luminescent coating material LP is a coating material that contains a stress luminescent material that emits light when a force is applied thereto. The stress luminescent coating material LP is preferably coated on a component of the construction machine before the construction machine is shipped. However, the stress luminescent coating material LP may also be coated on the component after the construction machine is shipped. The stress luminescent coating material LP emits light in response to an application of force due to expansion/contraction of the component that is coated with the stress luminescent coating material LP. The intensity (luminous intensity) of light emitted by the stress luminescent coating material LP is typically higher when a greater force is applied thereto. Also, when the applied force subsequently decreases the luminous intensity of the emitted light also decreases, and when the applied force disappears, the luminous intensity of the emitted light also disappears. The stress luminescent material included in the stress luminescent coating material LP may be strontium aluminate doped with europium ($SrAl_2O_4$:Eu), calcium aluminum aluminosilicate doped with europium ($CaAl_2SiO_8$:Eu), or barium calcium titanate doped with praseodymium (($BaCa)TiO_3$:Pr), for example. In particular, strontium aluminate doped with europium ($SrAl_2O_4$:Eu) has the highest light emission intensity among the above stress luminescent materials, and emits green-colored light when a force is applied thereto. Aluminum calcium aluminosilicate doped with europium and barium calcium titanate doped with praseodymium respectively emit blue-colored light and red-colored light when a force is applied thereto. The stress luminescent material may also be a zirconium oxide ($ZrO_2$) dispersion or zinc sulphide doped with manganese (ZnS:Mn), for example. Zinc sulfide doped with manganese emits yellow-orange-colored light when a force is applied thereto.

The surface of the boom 4 that is coated with the stress luminescent coating material LP is imaged using a camera including an image capturing element such as a CCD (charge-coupled device), a CMOS (complementary metal-oxide-semiconductor), or the like. Preferably, the surface of the boom 4 is imaged by the camera 205 of the aircraft 200. The surface of the boom 4 may also be imaged using the camera S6 attached to the upper turning body 3 of the excavator 100 or a portable camera included in a tablet PC or a smartphone carried by a worker (related person) situated near the excavator 100, for example. Note that using the camera 205 of the aircraft 200 may be advantageous in that the camera 205 may be able to capture portions that are difficult to capture using a portable camera carried by a worker, such as the surface of a metal plate arranged on the backside (+Z side) of the boom 4, for example. Also, using the camera 205 of the aircraft 200 may be advantageous in that the image can be automatically captured without bothering workers or the like, for example.

In the example shown in FIG. 9, the stress luminescent coating material LP is represented by dot hatching. Specifically, the stress luminescent coating material LP is coated on the surfaces of four metal plates arranged on the backside (+Z side), the left side (−Y side), the right side (+Y side) and the ventral side (−Z side) of the boom 4 at a section between a boom cylinder boss 4*a* and a boom foot 4*b* of the boom 4. Also, the stress luminescent coating material LP is coated on the surfaces of the four metal plates arranged on the backside (+Z side), the left side (−Y side), the right side (+Y side) and the ventral side (−Z side) of the boom 4 at a section between the boom cylinder boss 4*a* and a boom top 4*c* of the boom 4. More specifically, the stress luminescent coating material LP is coated on locations at which stress is likely to be concentrated, such as welding bead portions corresponding to welding portions of partition walls. However, the stress luminescent coating material LP may also be coated on the entire surface of the boom 4, for example. Alternatively, instead of directly applying the stress luminescent coating material LP onto the surface of the boom 4, a sheet coated with the stress luminescent coating material LP may be attached to the surface of the boom 4, for example. The stress luminescent coating material LP may be applied in a similar manner even in the case where the stress luminescent coating material LP is coated on some other component of the excavator 100 such as the arm 5, for example.

The stress state detecting unit F9 can generate a display image by performing various image processes on images (camera images) captured by a camera at predetermined time intervals. The display image may be an image displayed on the display device 40, the display device 304, or the like. Note that in some embodiments, the camera image may be used as the display image as is, for example. The camera image may include an image of the entire boom 4, for example. An image of the entire boom 4 may be included in the camera image so that the viewer of the display image can easily perceive the positions of portions of the boom 4 coated with the stress luminescent coating material LP relative to the entire boom 4, for example. Note that the display image may be generated from one camera image or from a plurality of camera images.

Figure 10A:
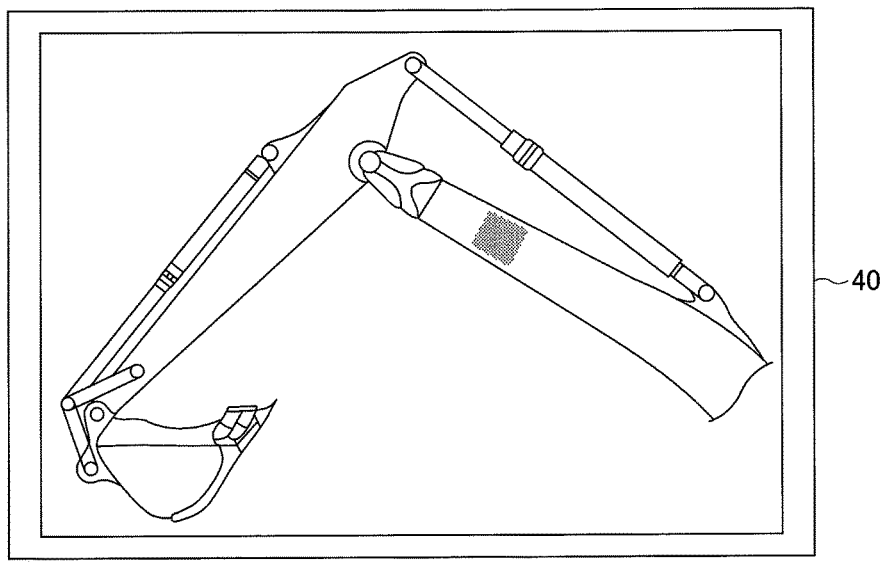
FIG. 10A is a diagram illustrating an example display image indicating a state of the stress luminescent coating material coated on a boom.
Figure 10B:
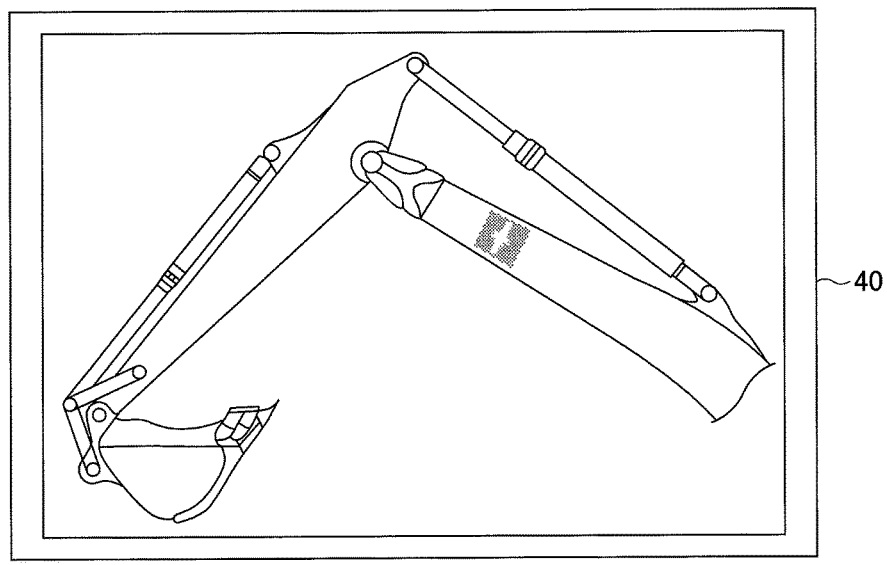
FIG. 10B is a diagram illustrating another example display image indicating a state of the stress luminescent coating material coated the boom.

FIGS. 10A and 10B illustrate examples of display images generated by the stress state detecting unit F9. Specifically, FIG. 10A illustrates a display image showing a state in which a load is hardly applied to the boom 4, namely, a state in which the stress luminescent coating material LP is not emitting light. FIG. 10B illustrates a display image showing a state in which a load is applied to the boom 4, namely, a state in which the stress luminescent coating material LP is emitting light. In the present embodiment, the stress state detecting unit F9 implements image processing so that the posture of the excavating attachment in the display images is always the same. Such measure is implemented for the purpose of facilitating viewing by the viewer. Thus, the postures of the excavating attachments in FIG. 10A and FIG. 10B may actually differ from each other but are displayed to be the same in the display images. The stress state detecting unit F9 may also be configured to implement image processing to generate a display image that enables three-dimensional viewing so that a viewer can view the image of the excavating attachment from a desired viewpoint (e.g., a viewpoint from below the boom 4), for example. The stress state detecting unit F9 may also be configured to display images showing the state in which a load is hardly applied to the boom 4 and the state in which a load is applied to the boom 4 side by side or one on top of the other on the display device 40 or the display device 304, for example.

The stress state detecting unit F9 can detect the state of stress acting on a component of a construction machine by implementing various image recognition processes on a camera image. For example, the stress state detecting unit F9 may detect the state of stress acting on the boom 4 based on the luminance value of the stress luminescent coating material LP on the surface of the boom 4 that is captured in the camera image. The luminance value of the stress luminescent coating material LP corresponds to the luminous intensity of light emitted by the stress luminescent coating material LP.

For example, the stress state detecting unit F9 may determine that a crack has been formed in the boom 4 when the luminance value of the stress luminescent coating material LP is greater than or equal to a predetermined value. Alternatively, the stress state detecting unit F9 may predict the time a crack will be formed in the boom 4 based on the temporal transition of the luminance value distribution, for example. In this case, the stress state detecting unit F9 may save a plurality of display images in chronological order, for example. Each display image may be stored in association with the actual posture of the excavating attachment, weight of soil, and the like, for example. The weight of soil may be derived from a boom cylinder pressure or the like, for example.

The stress state detecting unit F9 may additionally display information indicating that a crack has been formed or the predicted time a crack will be formed on the display image, for example. Also, the stress state detecting unit F9 may emphasize a high stress portion (high luminance portion) in the display image so that the viewer can distinguish the high stress portion (high luminance portion) from other portions. Note that a portion of the display image may be emphasized through brightened display, shaded display, highlight display, or the like, for example.

The stress state detecting unit F9 may transmit information to the aircraft 200 via the transmitting device S1 so that the camera 205 of the aircraft 200 can capture an image of the attachment from a position at least a predetermined distance away from the attachment. For example, the stress state detecting unit F9 may transmit information on the position, posture, orientation, and the like of the excavator 100 to the aircraft 200 so that the camera 205 can capture an image of the boom 4 from a position at least a predetermined distance away from the boom 4. In turn, the aircraft 200 that receives the information may autonomously fly into the sky to capture images of the respective surfaces of the four metal plates of the boom 4 arranged on the backside (+Z side), the left side (−Y side), the right side (+Y side), and the ventral side (−Z side) of the boom 4, for example. Note that in some embodiments, the aircraft 200 may be configured to automatically recognize the attachment using image recognition or the like and capture an image of the attachment. In this case, the attachment may be set up in advance as an image capturing target. For example, the shape of the attachment may be registered in advance as the shape of an image recognition target. Also, in some embodiments, the flight path of the aircraft 200 may be set up in advance.

The stress state detecting unit F9 may also be configured to output information on the image capturing timing to the exterior via the transmitting device S1 so that a camera can capture a camera image at the appropriate timing. For example, the stress state detecting unit F9 may determine whether a load is applied to the excavating attachment based on outputs from various sensors such as the pilot pressure sensor 15a and a boom cylinder pressure sensor. Upon determining that a load is applied to the excavating attachment, the stress state detecting unit F9 may notify the aircraft 200 to that effect. In this way, the camera 205 can capture an image of the excavating attachment while a load is being applied to the excavating attachment. By capturing the excavating attachment with the camera 205 upon receiving such a notification, the aircraft 200 can capture an image of the excavating attachment while a load is being applied to the excavating attachment. The stress state detecting unit F9 may also notify the aircraft 200 that a load is not being applied to the excavation attachment for the same purpose of enabling the aircraft 200 to capture an image at the appropriate timing, for example.

The work management system SYS may also include an illuminance sensor for detecting the brightness of ambient light. The illuminance sensor is preferably attached to the excavator 100. The illuminance sensor may be used to determine the timing for capturing an image of the surface of the boom 4 coated with the stress luminescent coating material LP. This is because light emitted by the stress luminescent coating material LP can be more easily detected as the surrounding becomes darker. In this case, when the excavator 100 determines that the brightness of ambient light is suitable for capturing an image of the surface of the boom 4 based on the output of the illuminance sensor, the excavator 100 may notify the aircraft 200 to that effect. The excavator 100 may also notify the aircraft 200 that the brightness of ambient light is not suitable for capturing an image of the surface of the boom 4 for the same purpose, for example. The illuminance sensor may be an image sensor such as a camera. The stress state detecting unit F9 may be configured to correct the luminance of the camera image and the display image based on the output of the illuminance sensor, for example.

With the above configuration, the work management system SYS enables early detection of a crack forming in the excavating attachment. A viewer that views the display image can easily perceive the transition of the stress state of the excavating attachment and can easily devise a maintenance plan for the excavating attachment. Also, the viewer that views the display image can easily check the portion of the excavating attachment at which stress is concentrated during operation of the excavator 100, for example. Further, when a crack is formed, subsequent development of the crack can be easily ascertained based on the transition of the stress state of the excavating attachment, for example.

Note that in a configuration using a strain gauge, the remaining service life of the boom 4 is estimated by calculating the stress acting on the center portion of each of the four metal plates arranged on the backside (+Z side), the left side (−Y side), the right side (+Y side) and the ventral side (−Z side) of the boom 4 to thereby calculate the load level acting on the boom 4. On the other hand, in the present embodiment, the stress luminescent coating material LP is coated on a location where a crack is likely to be formed, and in this way, the development of a crack may be directly perceived.

In the above-described embodiment, the stress luminescent coating material LP is applied to the outer surface of the metal plates constituting the boom 4. However, a viewer may also be able to detect a crack formed at the inner side of the metal plate, for example. This is because the stress state of the outer surface of the metal plate is affected by the stress state of the inner surface of the metal plate.

Although the present invention has been described above with respect to certain illustrative embodiments, the present invention is not limited to the above-described embodiments and various modifications and substitutions can be made to the above-mentioned embodiments without departing from the scope of the present invention.

For example, in the above-described embodiments, the aircraft 200 is configured to automatically take off and automatically fly from the parking lot into the sky above a progress region upon detecting that the excavator 100 is in a stopped state during lunch break or after having completed work for the day. However, the present invention is not limited to such configuration. For example, the aircraft 200 may be configured to automatically fly from the parking lot into the sky above the progress region at a predetermined time that is set up in advance, or start flying in response to an operation input by an operator.

The construction machine may also be a bulldozer, a wheel loader, or the like.

What is claimed is:

1. A construction machine work management system including a construction machine, an aircraft equipped with an image capturing device, and a management device, the construction machine work management system comprising:

a processor configured to
acquire position information of the construction machine via wireless communication;
specify a progress region within a work site on which work progress has been made by the construction machine, based on the acquired position information of the construction machine; and
set up a flight path of the aircraft with respect to the progress region specified based on the position information within the work site, so that the image capturing device of the aircraft can capture an image of the progress region.

2. The construction machine work management system according to claim 1, wherein the processor is further configured to
generate topographical data relating to the progress region based on the image of the progress region captured by the image capturing device; and
calculate a work amount of the construction machine based on the topographical data relating to the progress region.

3. The construction machine work management system according to claim 2, wherein
the processor is further configured to generate topographical data relating to the work site by joining the topographical data relating to the progress region and topographical data relating to a region other than the progress region within the work site.

4. The construction machine work management system according to claim 3, wherein
the processor is further configured to calculate a progress rate of work performed by the construction machine based on the topographical data relating to the work site.

5. The construction machine work management system according to claim 4, wherein the processor is further configured to
specify a plurality of progress regions relating to a plurality of construction machines;
generate the topographical data relating to the work site that includes topographical data relating to the plurality of progress regions; and
calculate a progress rate of collaborative work performed by the plurality of construction machines based on the topographical data relating to the work site.

6. The construction machine work management system according to claim 1, wherein
the processor is configured to, when an unauthenticated object enters a predetermined region within the work site, set up the flight path of the aircraft so that the aircraft is directed to the unauthenticated object.

7. The construction machine work management system according to claim 6, wherein the aircraft includes a speaker and a microphone.

8. The construction machine work management system as claimed in claim 1, wherein the construction machine includes
an attachment that is coated with a stress luminescent coating material; and
a processor configured to detect a state of stress acting on the attachment based on an image of the attachment captured with a load being applied to the attachment.

9. The construction machine work management system according to claim 8, wherein
the image of the attachment is captured by the image capturing device of the aircraft; and the processor of the construction machine is configured to transmit information to the aircraft so that the image capturing device can capture the image of the attachment from a position at least a predetermined distance away from the attachment.

10. The construction machine work management system according to claim 9, wherein
the processor of the construction machine is configured to notify the aircraft that the load is applied to the attachment so that the image capturing device can capture the image of the attachment when the load is applied to the attachment.

11. The construction machine work management system according to claim 8, wherein the image of the attachment is captured by a portable camera.

12. The construction machine work management system according to claim 8, wherein the stress luminescent coating material is coated on a welding bead portion of the attachment.

13. The construction machine work management system according to claim 1, wherein the progress region is a region whose topographical change is not reflected in topographical data relating to the work site, within a region that has been worked on by the construction machine within the work site.

14. The construction machine work management system according to claim 13, wherein the processor is further configured to generate topographical data relating to the progress region based on the image of the progress region captured by the image capturing device of the aircraft, and generate current topographical data relating to the work site by joining the generated topographical data relating to the progress region to the topographical data relating to the work site.

15. A construction machine comprising:
a processor configured to specify a progress region within a work site on which work progress has been made by the construction machine, based on position information of the construction machine, so that an aircraft that is equipped with an image capturing device and is configured to fly along a flight path can have the image capturing device capture an image of the progress region, the flight path being set up with respect to the progress region specified based on the position information within the work site.

16. The construction machine according to claim 15, further comprising:
a display device configured to display a work amount calculated based on the image of the progress region captured by the image capturing device.

17. The construction machine according to claim 15, further comprising:
a display device configured to display topographical data relating to the work site that is generated by joining topographical data relating to the progress region generated based on the image of the progress region captured by the image capturing device and topographical data relating to a region other than the progress region within the work site.

18. A construction machine work management method for managing a system including a construction machine, an aircraft equipped with an image capturing device, and a management device, the construction machine work management method comprising:
specifying a progress region within a work site on which work progress has been made by the construction machine, based on position information of the construction machine; and setting up a flight path of the aircraft with respect to the progress region specified based on the position information within the work site, so that the image capturing device of the aircraft can capture an image of the progress region.

* * * * *